United States Patent Office 2,766,220
Patented Oct. 9, 1956

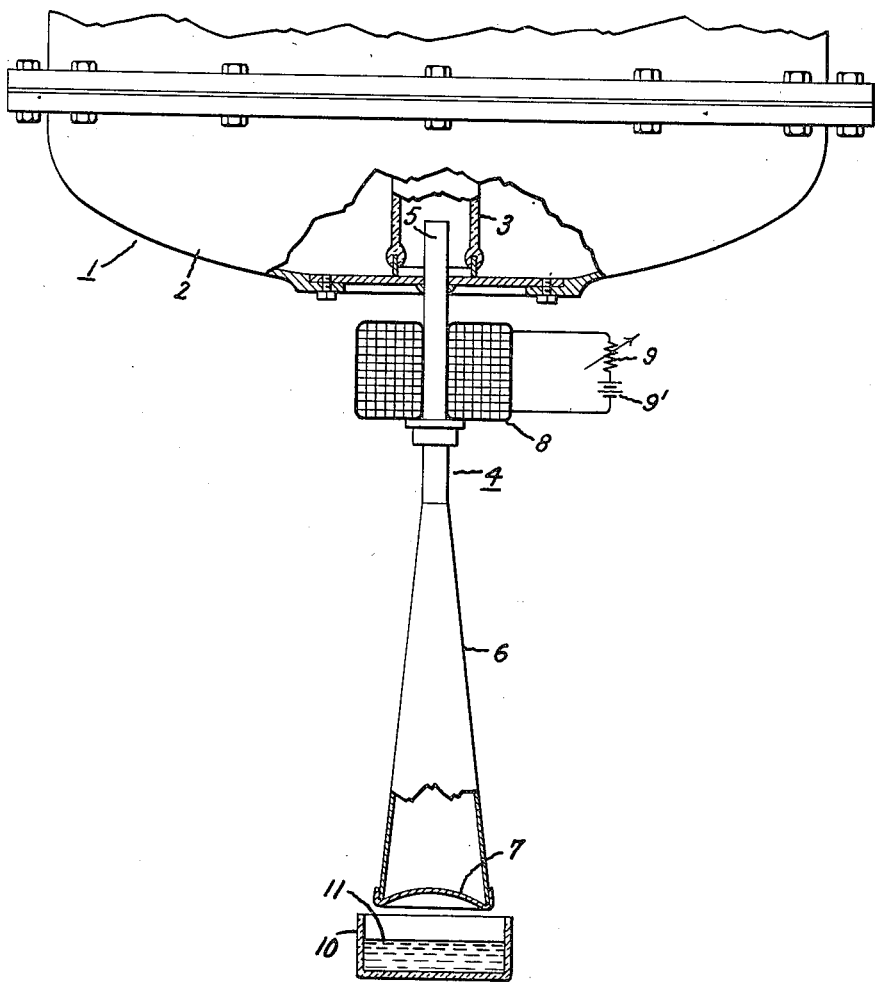
Inventor:
Simon W. Kantor,
by Paul A. Frank
His Attorney.

2,766,220

IRRADIATION OF OCTAMETHYLCYCLOTETRA-SILOXANE AND PRODUCTS THEREOF

Simon W. Kantor, Schenectady, N. Y., assignor to General Electric Company, a corporation of New York Application May 11, 1954, Serial No. 429,137

8 Claims. (Cl. 260—46.5)

This invention relates to two new compounds, bis-heptamethylcyclotetrasiloxanyl-methane having the formula

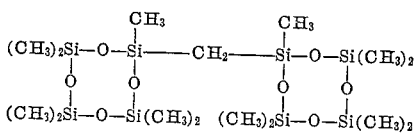

and diheptamethylcyclotetrasiloxanyl having the formula

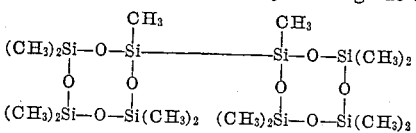

and to the method of preparing these two compounds. More particularly, this invention is concerned with a process for preparing these two compounds which comprises irradiating octamethylcyclotetrasiloxane with high energy electrons. This invention is also concerned with a polymerizable organopolysiloxane solution comprising (a) octamethylcyclotetrasiloxane, (b) from 0.1 to 10 percent, by weight, of a compound selected from the class consisting of bis-heptamethylcyclotetrasiloxanyl-methane and diheptamethylcyclotetrasiloxanyl and mixtures of the aforesaid compounds, and (c) from 0.001 to 0.5 percent, by weight, of an organopolysiloxane polymerization catalyst. This invention is also concerned with a method for preparing organopolysiloxane gels by irradiating octamethylcyclotetrasiloxane with high energy electrons and contacting the irradiated compound with an organopolysiloxane polymerization catalyst.

My invention may be best understood by reference to the following description taken in connection with the drawing which is a partially sectionalized, simplified view of accelerator apparatus useful in practicing the invention.

The compounds bis-heptamethylcyclotetrasiloxanyl-methane and diheptamethylcyclotetrasiloxanyl of the present invention are valuable per se as lubricants, lubricant additives, and hydraulic fluids. These compounds are also valuable as cross-linking agents for use in the preparation of organopolysiloxane potting gels for use as high temperature insulation material in electrical apparatus. The polymerizable organopolysiloxane solutions described above containing octamethylcyclotetrasiloxane, one or both of the new compounds, and an organopolysiloxane polymerization catalyst, are valuable as intermediates in the preparation of organopolysiloxane potting gels for use as high temperature insulating material in electrical apparatus.

In the past, organopolysiloxane gels have usually been prepared by contacting octamethylcyclotetrasiloxane with a suitable polymerization catalyst to form a high molecular weight gum. This gum has then been treated with a cross-linking agent such as an organic peroxide to form a gum. This has resulted in a gel containing the decomposition products of the organic peroxide cross-linking agent in solution or suspension. The decomposition products of the organic peroxides usually consist in part of acids and esters. It has been found to be disadvantageous to have these acids and esters in a gel since their presence in the gel tends to have a harmful effect on the electrical properties of the gel and also tends to cause degradation of the gel at to lower molecular weights when the gel is used at elevated temperatures. I have discovered that gels can be formed without the addition of these peroxide cross-linking agents by polymerizing a solution of octamethylcyclotetrasiloxane containing either bis-heptamethylcyclotetrasiloxanyl-methane or diheptamethylcyclotetrasiloxanyl or mixtures thereof. The presence of either of these compounds in the octamethylcyclotetrasiloxane solution provides the cross-linking necessary to form a gel upon polymerization of the low molecular weight solution. In the case of the former compound the cross-linking is provided through silicon-bonded methylene linkages and in the case of the latter compound the cross-linking is provided through silicon-silicon bonds. During the polymerization, the cyclic portions of these two compounds open up into linear configurations and join with the linear structures derived from octamethylcyclotetrasiloxane to form long-chain molecules which are cross-linked by the methylene bridge or the silicon-silicon linkage.

High energy electron irradiations of octamethylcyclotetrasiloxane may be accomplished by any type of high energy electron source. A typical source is shown in the accompanying drawing. The drawing shows a high voltage apparatus 1 capable of producing a beam of high energy electrons for irradiating octamethylcyclotetrasiloxane in accordance with the invention. High voltage apparatus 1 may be of the type disclosed in United States Patent 2,144,518 patented by Willem F. Westendorp on January 17, 1939, and assigned to the assignee of the present invention. In general, this apparatus comprises a resonant system having an open-magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil whereby a pulse of electrons is accelerated down envelope 3 once during each cycle of the energizing voltage when the upper extremity of the inductance coil is at a negative potential with respect to the lower end. Further details of the construction and operation of high voltage apparatus 1 may be found in the aforementioned Westendorp patent and in "Electronics," vol. 16, pp. 128–133 (1944).

To permit utilization of the high energy electrons accelerated down envelope 3, there is provided an elongated metal tube 4, the upper portion 5 of which is hermetically sealed to tank 2, as illustrated, by any convenient means such as silver solder. The lower portion 6 of tube 4 is conical in cross-section to permit an increased angular spread of the electron beam. The emergence of high energy electrons from tube 4 is facilitated by an end-window 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002 inch thickness has been found satisfactory for use with electron energies of about 230,000 electron volts or greater. Beryllium and other materials of low stopping power may also be employed with efficacy. By forming end-window 7 in arcuate shape as shown, greater strength for resisting the force of atmospheric pressure may be obtained for a given window thickness. Desired focusing of the accelerated electrons may be secured by a magnetic-field generating winding 8 energized by a source of direct current 9' through a variable resistor 9.

In the irradiation of octamethylcyclotetrasiloxane with the high voltage apparatus 1, a receptacle 10 containing octamethylcyclotetrasiloxane 11 may be supported in the path of the electrons emerging from the end-window 7 as illustrated. The high energy electrons penetrate the compound 11 to a depth dependent upon their energy and cause transformation of a portion of the octamethylcyclotetrasiloxane into bis - heptamethylcyclotetrasiloxanyl-methane and diheptamethylcyclotetrasiloxanyl.

The dose of radiation applied to the octamethylcyclotetrasiloxane, the rate of radiation, and the time of radiation may vary within wide limits. For a given amount of octamethylcyclotetrasiloxane, the percentage of bis-heptamethylcyclotetrasiloxanyl-methane and diheptamethylcyclotetrasiloxanyl increases with an increase in the total dose. This total dosage is computed in terms of Roentgen units. A Roentgen unit (R), as usually defined, is the amount of radiation that produces one electrostatic unit of ion pairs per milliliter of dry air under standard conditions, and as employed here, refers to the amount of electron radiation measured with an air equivalent ionization chamber at the position of the surface of the octamethylcyclotetrasiloxane. In general, we have found that suitable amounts of the new compounds of the present invention are obtained using total dosages of from $1 \times 10^6$ to $1 \times 10^9$ R. Once the desired dosage has been selected, the rate of radiation may be varied within wide limits, for example, from about $1 \times 10^4$ to $1 \times 10^6$ R per second to provide the desired dose in the desired period of time. We preferably adjust the rate of radiation so that the desired dosage will be obtained in a matter of seconds. Since the high energy electrons will tend to form ozone between end-window 7 and receptacle 10 when this space is filled with air, it is desirable to maintain the apparatus in vacuum or under a nitrogen atmosphere when irradiating for periods greater than about one minute. The temperature at which irradiation is carried out has no appreciable effect on the rate or degree of reaction. For convenience, we prefer to irradiate the octamethylcyclotetrasiloxane at room temperature. After the irradiation is completed, the octamethylcyclotetrasiloxane, the bis-heptamethylcyclotetrasiloxanyl-methane and the diheptamethylcyclotetrasiloxanyl may be isolated by fractional distillation.

In preparing gels by the process of the present invention I have found it desirable to prepare octamethylcyclotetrasiloxane solutions of the two new compounds which contain a total of from about 0.1 to 10 percent, by weight, of the new compounds. With weight percentages near the lower portion of the range just described, soft, rubbery gels are obtained. With weight percentages near the upper limit of the range, fairly stiff gels are obtained. By controlling the irradiation dose applied to the octamethylcyclotetrasiloxane, the weight percentages of the new compounds in solution may be controlled. For example, when using a total of about $2 \times 10^7$ R, a solution containing about 3 percent, by weight, of the new compounds is obtained. When using higher doses of radiation, higher concentrations of the new compounds are obtained. Organopolysiloxane solutions containing the desired amount of the new compounds may also be prepared by subjecting octamethylcyclotetrasiloxane to a high dose of radiation to form a concentrated "stock" solution. This stock solution may then be diluted with pure octamethylcyclotetrasiloxane to form a solution of the desired concentration.

As is the case with most liquids, the octamethylcyclotetrasiloxane solution often contains dissolved air. Since this solution is to be polymerized to a gel, it is desirable to remove any dissolved air by evacuation prior to polymerization to remove the danger of formation of air bubbles in the finished gel.

The polymerizable organopolysiloxane solution of the present invention is the octamethylcyclotetrasiloxane solution of the new compounds, bis-heptamethylcyclotetrasiloxanyl-methane and diheptamethylcyclotetrasiloxanyl. This solution may be polymerized by adding from about 0.001 to 0.5 percent of an organopolysiloxane polymerization catalyst to the octamethylcyclotetrasiloxane solution. By organopolysiloxane polymerization catalyst is meant any catalyst, such as a basic catalyst, which will cause rearrangement and condensation of organopolysiloxanes from a low molecular weight state to a high molecular weight state. Among these organopolysiloxane polymerization catalysts are included, for example, sodium hydroxide, potassium hydroxide, cesium hydroxide, and the transient catalysts such as the solid quaternary ammonium hydroxides which are disclosed in my copending patent application Serial No. 429,132, and the quaternary phosphonium compounds which are described in my joint copending patent application with Alfred R. Gilbert, Serial No. 429,134, the latter now abandoned, both of these applications being filed concurrently herewith and assigned to the same assignee as the present invention. The solid quaternary ammonium hydroxide catalysts include tetramethyl ammonium hydroxide and benzyl trimethyl ammonium hydroxide. The quaternary phosphonium compounds which may be used as polymerization catalysts include, for example, tetra-n-butyl phosphonium hydroxide, tetra-n-butyl phosphonium butoxide, tetraethyl phosphonium hydroxide, butyl tricyclohexyl phosphonium hydroxide, etc. The quaternary ammonium and quaternary phosphonium transient catalysts are preferably used in the practice of the present invention since they may be decomposed after the gels are formed. It is well known that the presence of a polymerization catalyst in a gel causes degradation of a gel to a low molecular state when the gel is subjected to a temperature of the order of 200 to 250° C. for any length of time. When using the transient catalysts discussed above, the resulting gels may be maintained at a temperature of 250° C. for extended periods of time without degradation to a low molecular weight state.

The temperature and time required to form a gel by the method of the present invention may vary widely depending on the particular organopolysiloxane polymerization catalyst used. For example, when using potassium hydroxide as a polymerization catalyst, the temperature of the reaction is from about 145 to 160° C. When using cesium hydroxide, the temperature of polymerization ranges from about 110 to 150° C. When using quaternary ammonium compounds the temperature range is from about 75 to 130° C. When using the quaternary phosphonium catalyst, the temperature of polymerization may vary from about room temperature up to 130° C. The time required for polymerization to be completed is the shortest at the upper limits of the temperature ranges for the various catalysts. Thus, when using potassium hydroxide at a temperature near 160° C. polymerization is completed in two to three hours. When using either the quaternary ammonium or quaternary phosphonium catalysts at temperatures from about 110 to 130° C., the polymerization is completed within a few minutes. The polymerization is effected by merely adding the polymerization catalyst to the octamethylcyclotetrasiloxane solution and heating the resulting polymerizable solution up to the polymerization temperature and maintaining it at this temperature until polymerization is completed. When using a transient catalyst such as the quaternary ammonium or quaternary phosphonium compounds, it is desirable to heat the gel to a temperature above about 130° C. for times up to about one hour to cause decomposition of the polymerization catalyst.

The following examples are illustrative of the practice of my invention and are not intended for purposes of limitation.

Example 1

Bis-heptamethylcyclotetrasiloxanyl - methane and diheptamethylcyclotetrasiloxanyl were prepared by placing octamethylcyclotetrasiloxane in receptacle 10 and passing a stream of nitrogen over the surface of the liquid. The compound was then irradiated with high voltage apparatus 1 to a dose of $1 \times 10^8$ R by using a rate of $2.4 \times 10^5$ Roentgens per second for 420 seconds. Fractional distillation of the irradiated product yielded diheptamethylcyclotetrasiloxanyl which boiled between 82 and 86° C. at 0.2 mm. and which had a refractive index $n_D^{20}$ 1.4131 and a density $d_4^{20}$ 1.023. Chemical analysis of this compound showed it to contain 30.0 percent carbon, 7.5 percent hydrogen, 39.7 percent silicon (theoretical: 29.9 percent carbon, 7.5 percent hydrogen, and 39.9 percent silicon). Fractional distillation of the irradiated compound also yielded bis-heptamethylcyclotetrasiloxanyl-methane which boiled at 89 to 93° C. at 0.2 mm. and which had a refractive index $n_D^{20}$ 1.4157 and a density $d_4^{20}$ 1.019. Chemical analysis of this compound showed it to contain 31.1 percent carbon, 7.6 percent hydrogen and 38.3 percent silicon (theoretical: 31.2 percent carbon, 7.7 percent hydrogen and 38.9 percent silicon).

Example 2

By the method of Example 1, 100 ml. of octamethylcyclotetrasilane was irradiated with high energy electrons to a dose of $2 \times 10^7$ R. This resulted in an octamethylcyclotetrasiloxane solution containing a total of about 3 percent, by weight, of bis-heptamethylcyclotetrasiloxanyl-methane and diheptamethylcyclotetrasiloxanyl.

Example 3

A polymerizable solution was prepared by adding 0.01 gram (0.02 percent, by weight) of solid tetramethyl ammonium hydroxide, containing about 25 percent, by weight, water of crystallization, to 50 grams of the solution prepared in Example 2. This solution was subjected to a vacuum of about 10 microns for 15 minutes to remove any dissolved air and then returned to one atmosphere under nitrogen. The resulting solution was then heated to 120° C. and maintained at this temperature for 10 minutes to form a tough gel which was colorless, bubble-free, and heat-stable.

Example 4

A polymerizable solution containing 0.02 percent of tetra-n-butyl phosphonium hydroxide was prepared by adding 0.3 ml. of a methylpolysiloxane solution of tetra-n-butyl phosphonium hydroxide containing 10 mg. of the aforesaid compound per milliliter of solution to 50 ml. of the product of Example 2. The tetra-n-butyl phosphonium hydroxide solution was prepared by the method disclosed in the aforementioned application Serial No. 429,134, now abandoned. Dissolved air was removed from the solution by the method of Example 3 and the resulting solution was heated to 110° C. and maintained at this temperature for 10 minutes to form a gel which was similar in appearance and properties to the gel made in Example 3.

Example 5

Fifty ml. of the solution prepared in Example 2 was diluted to 150 ml. with octamethylcyclotetrasiloxane, and 0.04 gram of solid tetramethyl ammonium hydroxide containing about 25 percent, by weight, water of crystallization, were added. After removing dissolved air by the method of Example 3, the resulting solution was heated to a temperature of 100° C. and maintained at this temperature for 10 minutes until a clear, rubbery gel was formed.

Although the process of the present invention has been described with respect to irradiation by means of high energy electrons, it should be understood that the irradiation may be undertaken with ultraviolet rays. However, we prefer to use electron beam irradiation, since the sources of electron beam radiation generally available are more intense than the sources of ultraviolet radiation and thus the reaction may be effected more rapidly using electron irradiation.

Although the process of preparing gels has been described in detail with respect to octamethylcyclotetrasiloxane solutions of bis-heptamethylcyclotetrasiloxanyl-methane and diheptamethylcyclotetrasiloxanyl, it should be understood that other cyclic dimethylsiloxanes, dialkylsiloxanes or diarylsiloxanes may be added to the octamethylcyclotetrasiloxane solution before the polymerization to a gel is effected.

What I claim as new and desire to secure by Letters Patent of the United States is:

1. A composition of matter selected from the class consisting of (a) bis - heptamethylcyclotetrasiloxanyl - methane having the formula

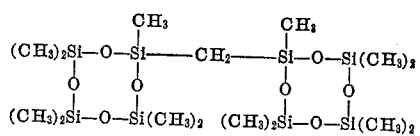

and (b) diheptamethylcyclotetrasiloxanyl having the formula

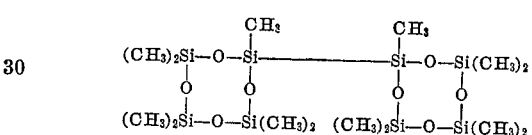

2. Bis-heptamethylcyclotetrasiloxanyl-methane having the formula

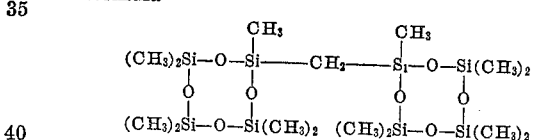

3. Diheptamethylcyclotetrasiloxanyl having the formula

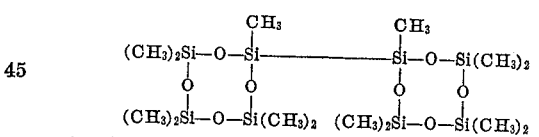

4. The process of preparing a compound selected from the class consisting of bis-heptamethylcyclotetrasiloxanyl-methane and diheptamethylcyclotetrasiloxanyl, which process comprises irradiating octamethylcyclotetrasiloxane to a dose of from $1 \times 10^6$ to $1 \times 10^9$ Roentgens with electrons having an energy of about 230,000 electron volts.

5. A polymerizable composition comprising (a) octamethylcyclotetrasiloxane, (b) from 0.1 to 10 percent by weight of a compound selected from the class consisting of bis-heptamethylcyclotetrasiloxanyl-methane and diheptamethylcyclotetrasiloxanyl and mixtures of the aforesaid compounds and (c) from 0.001 to 0.5 percent, by weight, of a basic organopolysiloxane rearrangement and condensation catalyst.

6. A polymerizable composition comprising (a) octamethylcyclotetrasiloxane and (b) from 0.1 to 10 percent, by weight, of a compound selected from the class consisting of bis-heptamethylcyclotetrasiloxanyl-methane and diheptamethylcyclotetrasiloxanyl and mixtures of the aforesaid compounds.

7. A polymerizable composition consisting of (a) octamethylcyclotetrasiloxane, (b) from 0.1 to 10 percent, by weight, of a compound selected from the class consisting of bis-heptamethylcyclotetrasiloxanyl-methane and diheptamethylcyclotetrasiloxanyl and mixtures of the aforesaid compounds and (c) from 0.001 to 0.5 percent, by weight, of a transient organopolysiloxane polymerization catalyst selected from the class consisting of solid tetramethyl ammonium hydroxide, solid benzyl trimethyl ammonium hydroxide and a quaternary phosphonium hydroxide.

8. The process of preparing an organopolysiloxane gel, which process comprises (a) irradiating octamethylcyclotetrasiloxane to a dose of from $1 \times 10^6$ to $1 \times 10^9$ Roentgens with electrons having an energy of about 230,000 electron volts to form a solution of the aforesaid compound containing a compound selected from the class consisting of bis-heptamethylcyclotetrasiloxanylmethane and diheptamethylcyclotetrasiloxanyl and mixtures thereof, and (b) heating the product of (a) with a basic organopolysiloxane rearrangement and condensation catalyst.

References Cited in the file of this patent

Partington: A Text Book of Inorganic Chemistry, 6th edition, McMillan, 1950, pages 444 and 445.

Pollard: Applied Nuclear Physics, 1951, 2nd ed., page 274.

Rochow: Chemistry of the Silicones, Wiley, 1951, 2nd ed., pages 84 and 85.

Lawton et al.: Nature, July 11, 1953, vol. 172, No. 4367, pp. 76, 77.